United States Patent
Tsuchida et al.

(12) 
(10) Patent No.: US 11,117,601 B2
(45) Date of Patent: Sep. 14, 2021

(54) RADIO TRAIN CONTROL SYSTEM AND RADIO TRAIN CONTROL METHOD

(71) Applicant: Mitsubishi Electric Corporation, Tokyo (JP)

(72) Inventors: Katsunori Tsuchida, Tokyo (JP); Atsushi Takami, Tokyo (JP); Tomohiro Onishi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 216 days.

(21) Appl. No.: 16/318,438

(22) PCT Filed: Aug. 4, 2016

(86) PCT No.: PCT/JP2016/072908
§ 371 (c)(1),
(2) Date: Jan. 17, 2019

(87) PCT Pub. No.: WO2018/025365
PCT Pub. Date: Feb. 8, 2018

(65) Prior Publication Data
US 2019/0291758 A1 Sep. 26, 2019

(51) Int. Cl.
*B61L 27/00* (2006.01)
*B60L 15/40* (2006.01)
(Continued)

(52) U.S. Cl.
CPC ............ *B61L 27/0038* (2013.01); *B60L 15/40* (2013.01); *B61L 1/18* (2013.01); *B61L 23/14* (2013.01);
(Continued)

(58) Field of Classification Search
CPC .... B61L 27/0038; B61L 1/18; B61L 27/0005; B61L 23/14; B61L 27/0066;
(Continued)

(56) References Cited

U.S. PATENT DOCUMENTS 5,420,883 A * 5/1995 Swensen ................. B61L 3/125
342/450
8,989,926 B2 * 3/2015 Pretorius ................... E01B 7/20
701/19
(Continued)

FOREIGN PATENT DOCUMENTS

CN 102233887 A 11/2011
EP 2039583 A1 3/2009
(Continued)

OTHER PUBLICATIONS

Extended European Search Report dated Oct. 4, 2019 for corresponding European patent application No. 16911624.1, 9 pages.
(Continued)

*Primary Examiner* — Michael V Kerrigan
(74) *Attorney, Agent, or Firm* — Buchanan Ingersoll & Rooney PC (57) ABSTRACT

A radio train control system controls the trains on tracks on which track circuits are built, and includes: ground radio devices performing radio communication with the trains and acquiring position information of the trains; field devices acquiring track circuit state information indicating whether the track circuit is ON or OFF; ground base devices receiving the position information and the track circuit state information and transmitting control information to the trains; and an on-track vehicle control device receiving the position information and the track circuit state information and managing on-track information. The ground radio devices and the field devices have transmission paths connected with the on-track vehicle control device without the ground base devices, and the on-track vehicle control device can transmit the control information to the trains through the transmission paths when the ground base device is out of order.

5 Claims, 10 Drawing Sheets

(51) Int. Cl.
*B61L 1/18* (2006.01)
*B61L 23/14* (2006.01)

(52) U.S. Cl.
CPC ....... *B61L 27/0005* (2013.01); *B61L 27/0027* (2013.01); *B61L 27/0066* (2013.01); *B61L 27/0077* (2013.01); *B60L 2200/26* (2013.01); *B61L 2027/005* (2013.01)

(58) Field of Classification Search
CPC ............. B61L 27/0077; B61L 27/0027; B61L 2027/005; B60L 15/40; B60L 2200/26
See application file for complete search history.

(56) References Cited

U.S. PATENT DOCUMENTS

| | | | | |
|---|---|---|---|---|
| 9,216,749 | B2* | 12/2015 | Itagaki | B61L 1/02 |
| 2005/0133673 | A1* | 6/2005 | Sugita | B61L 27/0038 |
| | | | | 246/167 R |
| 2014/0211782 | A1* | 7/2014 | Yamaguchi | H04W 56/002 |
| | | | | 370/350 |
| 2014/0214247 | A1* | 7/2014 | Myokei | B61L 25/02 |
| | | | | 701/19 |

FOREIGN PATENT DOCUMENTS

| | | |
|---|---|---|
| JP | 2007015517 A | 1/2007 |
| JP | 2012-096704 A | 5/2012 |
| KR | 2013-0080173 A | 7/2013 |
| WO | 2012155835 A1 | 11/2012 |

OTHER PUBLICATIONS

International Search Report (PCT/ISA/210) dated Nov. 8, 2016, by the Japan Patent Office as the International Searching Authority for International Application No. PCT/JP2016/072908.

Office Action dated Mar. 5, 2021, by the India Patent Office in corresponding India Patent Application No. 201947001325 and English translation of the Office Action. (5 pages).

* cited by examiner

ON-TRACK INFORMATION OF TRAINS

| FRONT POSITION | | |
|---|---|---|
| BLOCK NUMBER | B1001 | |
| POSITION IN BLOCK | 100[m] | |
| REAR POSITION | | |
| BLOCK NUMBER | B1001 | |
| POSITION IN BLOCK | 40[m] | |
| ... | | |

TRACK CIRCUIT STATE INFORMATION

| TRACK CIRCUIT | STATE |
|---|---|
| T1 | OFF |
| T2 | ON |
| T3 | ON |
| ... | ... |

POINT MACHINE STATE INFORMATION

| POINT MACHINE | DIRECTION | LOCK STATE |
|---|---|---|
| 10 | NORMAL | LOCKED |
| ... | ... | ... |

RADIO TRAIN CONTROL SYSTEM AND RADIO TRAIN CONTROL METHOD

FIELD

The present invention relates to a radio train control system and a radio train control method.

BACKGROUND

A radio train control system called communication based train control (CBTC) controls train traffic through communication between a radio-control adaptive train and a ground base device that is a control device on the ground. When a ground base device fails to operate properly, such a radio train control system cannot obtain the positions of trains in an area controlled by the ground base device.

Patent Literature 1 serving as the prior art teaches a technique aiming at "providing a train control system capable of reliably controlling trains on tracks in an area covered by a base device that controls trains even when the base device has gone down", which can realize control of trains on tracks based on additional provision of an ID detection device connected to an on-track vehicle control device without interposition of a base device.

CITATION LIST

Patent Literature

Patent Literature 1: Japanese Patent Application Laid-open No. 2007-15517

SUMMARY

Technical Problem

With the aforementioned prior art, however, a device for detecting a train, which is connected to an on-track vehicle control device is essential. For this reason, there has been a problem of an increase in facility cost.

The present invention has been made in view of the above circumstances, and an object thereof is to provide a radio train control system capable of suppressing the increase in facility cost and reliably controlling trains on tracks even when a ground base device is out of order.

Solution to Problem

In order to solve the aforementioned problems and achieve the object, the present invention provides a radio train control system that controls a train on a track on which a track circuit is built, the radio train control system comprising: a ground radio device to perform radio communication with the trains and acquire position information of the train; a field device to acquire track circuit state information indicating whether the track circuit is ON or OFF; a ground base device to receive the position information and the track circuit state information and transmit control information to the train; and an on-track vehicle control device to manage on-track information with receiving the position information and the track circuit state information, wherein the ground radio device and the field device have a transmission path connected with the on-track vehicle control device without using the ground base device, and the on-track vehicle control device is capable of transmitting the control information to the train through the transmission path when the ground base device is out of order.

Advantageous Effects of Invention

The present invention produces an advantageous effect of making it possible to provide a radio train control system capable of suppressing the increase in facility cost and reliably controlling trains on tracks even when a ground base device is out of order.

DESCRIPTION OF EMBODIMENTS

A radio train control system and a radio train control method according to certain embodiments of the present invention will be described in detail below with reference to the drawings. Note that the present invention is not necessarily limited by the embodiments.

First Embodiment

Figure 1:
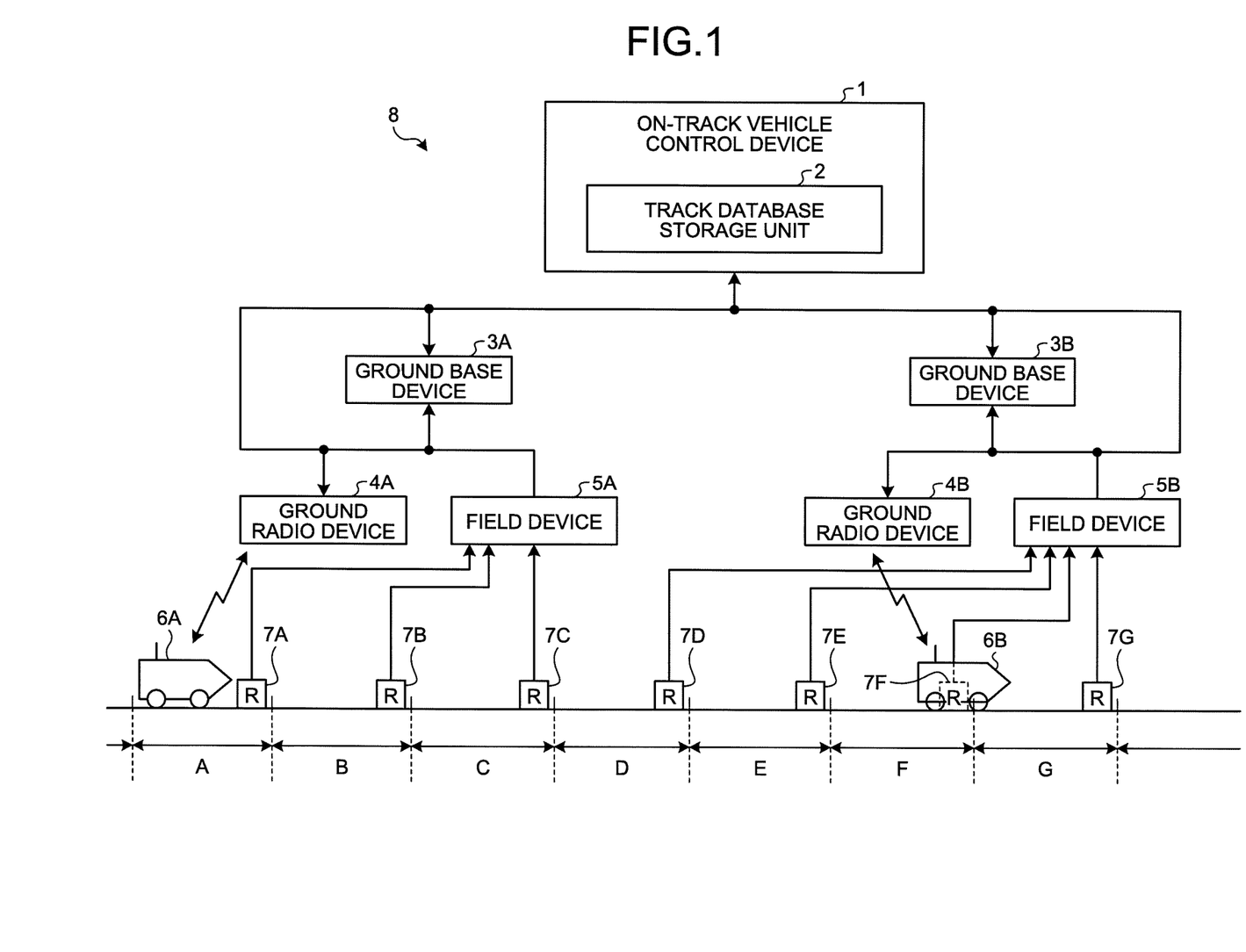
FIG. 1 is a diagram illustrating an example configuration of a radio train control system according to a first embodiment of the present invention.

FIG. 1 is a diagram illustrating an example configuration of a radio train control system 8 according to a first embodiment of the present invention. The radio train control system 8 illustrated in FIG. 1 includes an on-track vehicle control device 1 including a track database storage unit 2, ground base devices 3A and 3B, ground radio devices 4A and 4B, field devices 5A and 5B, trains 6A and 6B, and relays 7A, 7B, 7C, 7D, 7E, 7F, and 7G. The trains 6A and 6B travel on tracks on which track circuits are built.

Note that, in the description below, whether or not a failure is present is determined by whether or not communication is enabled. Specifically, the ground base device 3A is deemed to be out of order when communication with the ground base device 3A is disabled, and the ground base device 3B is deemed to be out of order when communication with the ground base device 3B is disabled. More specifically, the ground base devices 3A and 3B each transmit on-track information of trains in the control area to the on-track vehicle control device 1 at a constant frequency, for example, and the on-track vehicle control device 1 recognizes that the ground base device 3A or 3B is out of order when the on-track information to be transmitted ceases. Note that the on-track information includes at least either of train position information or track circuit state information, which will be described later. The track circuit state information is information indicating whether a track circuit is ON or OFF.

The on-track vehicle control device 1 manages the on-track information acquired from the ground base devices 3A and 3B, and is capable of transmitting train control information to the trains 6A and 6B as substituted for the ground base devices 3A and 3B when the ground base devices 3A and 3B are out of order.

The track database storage unit 2 stores a track database of an area controlled by the on-track vehicle control device 1. The track database will be described later.

The ground base devices 3A and 3B communicate with the trains 6A and 6B via the ground radio devices 4A and 4B to receive train information including the position information of the trains 6A and 6B, receive track circuit state information from the field devices 5A and 5B, and transmit train control information to the trains 6A and 6B.

The ground radio devices 4A and 4B perform radio communication with the trains 6A and 6B to wirelessly transmit the train control information transmitted from the ground base devices 3A and 3B to the trains 6A and 6B, acquire train information including the train position information received from the trains 6A and 6B and transmit the acquired train information to the ground base devices 3A and 3B. When the ground base devices 3A and 3B are out of order, the ground radio devices 4A and 4B wirelessly transmit the train control information transmitted from the on-track vehicle control device 1 to the trains 6A and 6B, and transmit the train information including the train position information received from the trains 6A and 6B to the on-track vehicle control device 1.

The field devices 5A and 5B acquire track circuit state information and point machine state information outputted from the relays 7A, 7B, 7C, 7D, 7E, 7F, and 7G, and transmit the acquired information to the ground base devices 3A and 3B. When the ground base devices 3A and 3B are out of order, the field devices 5A and 5B transmit the track circuit state information and the point machine state information to the on-track vehicle control device 1 through transmission paths connected to the field devices 5A and 5B without intervention of the ground base devices 3A and 3B. Note that the track circuit state information indicates OFF when a train is present on a track circuit, and the track circuit state information indicates ON when a train is not present on the track circuit. The point machine state information is information indicating directions and lock states of point machines.

Each of the trains 6A and 6B controlled by the radio train control system 8 includes an on-board control device, which is not illustrated, and an on-board radio device, which is not illustrated. The not-illustrated on-board radio devices perform radio communication with the ground radio devices 4A and 4B, and information acquired by the not-illustrated on-board radio devices through radio communication is acquired by the not-illustrated on-board control devices. The not-illustrated on-board control devices control the trains 6A and 6B.

Each of the relays 7A, 7B, 7C, 7D, 7E, 7F, and 7G outputs track circuit state information indicating whether or not a train is present on corresponding one of the track circuits represented by A to G in FIG. 1 to the field devices 5A and 5B.

The radio train control system 8 illustrated in FIG. 1 includes transmission paths through which the on-track vehicle control device 1 is connected with the ground radio devices 4A and 4B and the field devices 5A and 5B without intervention of the ground base devices 3A and 3B, and the on-track vehicle control device 1 can act as a ground base device in place of the ground base devices 3A and 3B. Thus, even when the ground base devices 3A and 3B are out of order, the on-track vehicle control device 1 is connected with the ground radio devices 4A and 4B and the field devices 5A and 5B through the transmission paths for connection without intervention of the ground base devices 3A and 3B, and then the on-track vehicle control device 1 is thus capable of operating the radio train control system 8 even when the ground base devices 3A and 3B are out of order by performing operation as a ground base device in place of the ground base devices 3A and 3B.

The transmission of information from the ground radio devices 4A and 4B and the field devices 5A and 5B to the on-track vehicle control device 1 may also be performed while the ground base devices 3A and 3B normally operate, or may be performed only when the ground base devices 3A and 3B are out of order.

In a case where both of a ground base device and a ground radio device are out of order, such as a case where both of the ground base device 3A and the ground radio device 4A are out of order, for example, the on-track vehicle control device 1 can acquire on-track information of trains in the control area from track circuit state information acquired from the field device 5A through the transmission paths connected without using the ground base device 3A.

As described above, the radio train control system 8 according to the first embodiment is capable of continuing to operate even when the ground base devices 3A and 3B are out of order since the on-track vehicle control device 1 performs operation as a ground base device when the ground base devices 3A and 3B are out of order. Next, the operation while the ground base devices 3A and 3B are out of order will be described.

Figure 2:
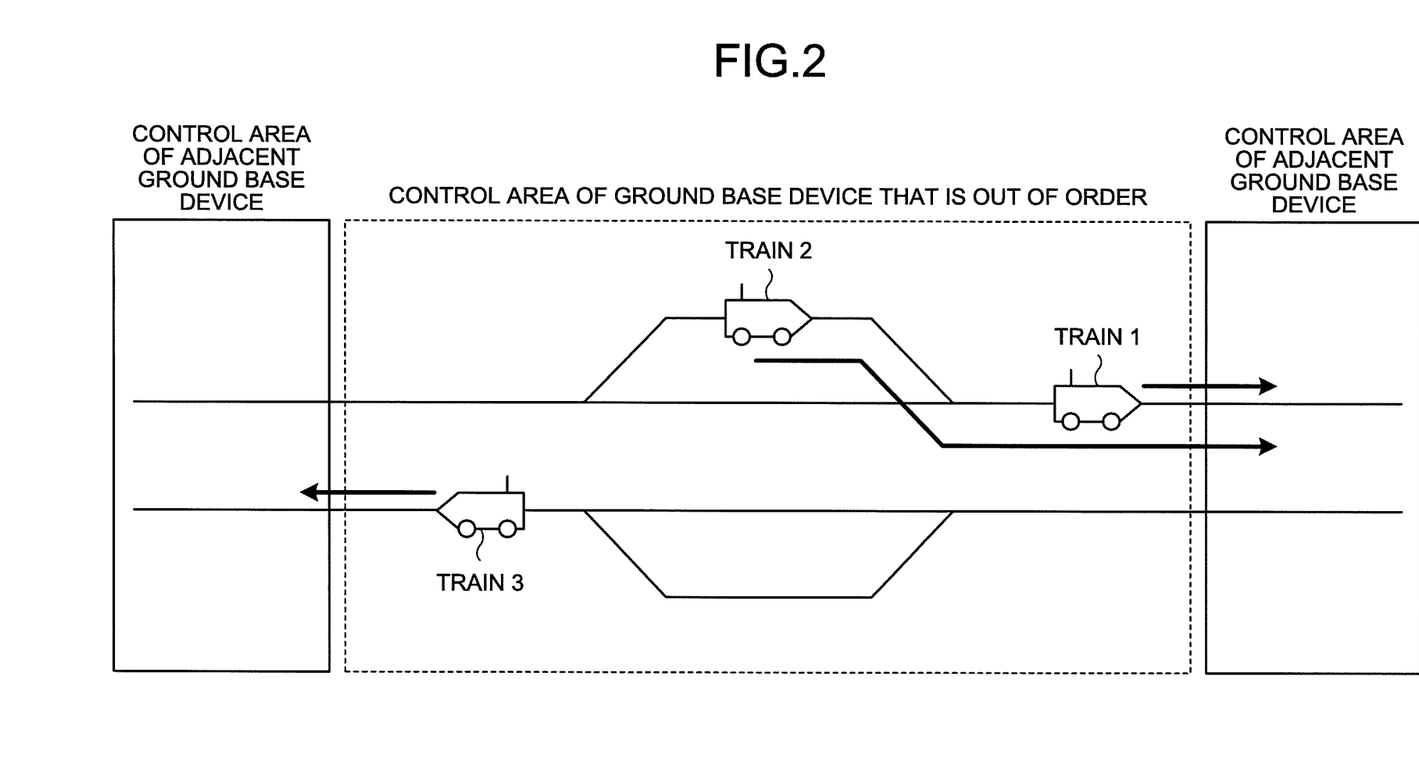
FIG. 2 is a diagram illustrating a control area of a ground base device that is out of order, and on-track states of trains in the area.

FIG. 2 is a diagram illustrating a control area of a ground base device that is out of order, and on-track states of trains in the area. In FIG. 2, the ground base devices adjacent to both sides of the control area of the ground base device that is out of order are not out of order but operate normally. The on-track vehicle control device 1 is capable of acquiring the on-track information of the trains also in the area of the ground base device that is out of order from the ground radio device and the field device through the transmission paths connected without using the ground base devices 3A and 3B. The on-track vehicle control device 1 acquires the on-track information of trains, the track circuit state information, and the point machine state information in the area of the ground base device that is out of order, and evacuates all the train(s) present in the area to the adjacent areas.

In FIG. 2, a train 1 and a train 3 can perform their evacuation operation since no other train is present between the trains 1 and 3 and corresponding one of controlled areas of the adjacent ground base devices. A train 2, however, cannot perform its evacuation operation until the evacuation operation of the train 1 is completed since the train 1 is present between the train 2 and the adjacent area. The train 2 starts the evacuation operation after the evacuation operation of the train 1 is completed.

Figure 3:
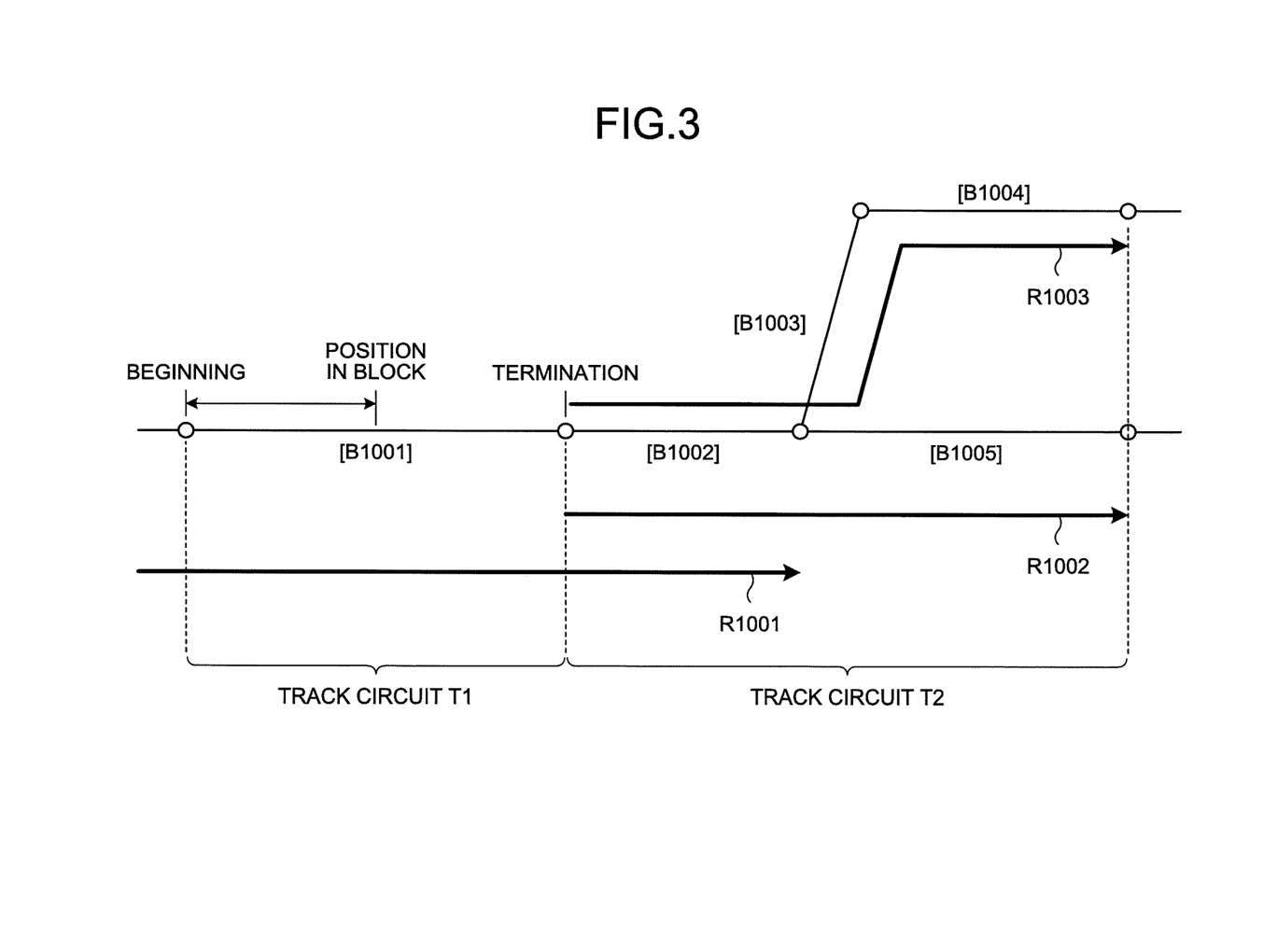
FIG. 3 is a diagram for explaining a method of expressing positions and paths in the first embodiment.

FIG. 3 is a diagram for explaining a method of expressing positions and paths in the first embodiment. FIG. 3 illustrates blocks [B1001], [B1002], [B1003], [B1004], and [B1005]. The block [B1001] is connected with the block [B1002], the block [B1002] is connected with the blocks [B1003] and [B1005], and the block [B1003] is connected with the block [B1004]. A path R1001 is a path from the block [B1001] to the block [B1002], a path R1002 is a path from the block [B1002] to the block [B1005], and a path R1003 is a path from the block [B1002] to the block [B1004]. A track circuit T1 is a track circuit of the block [B1001], and a track circuit T2 is a track circuit of the blocks [B1002], [B1003], [B1004], and [B1005].

In addition, as illustrated for the block [B1001], a block has a beginning and a termination, and a position in the block is expressed by a distance from the beginning or the termination.

Figure 4:
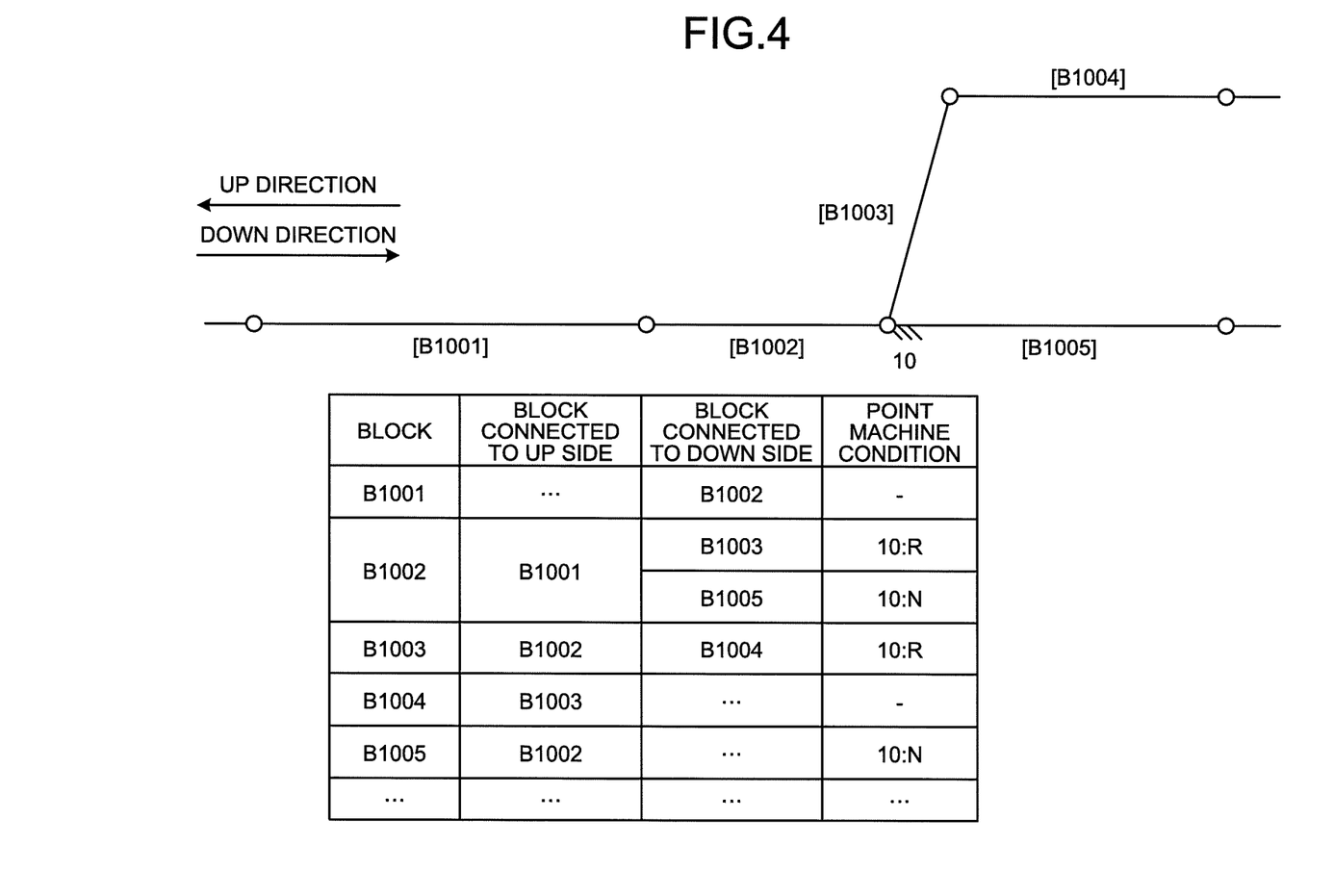
FIG. 4 is a diagram illustrating an example of a track database stored in a track database storage unit.

FIG. 4 is a diagram illustrating an example of the track database stored in the track database storage unit 2. In FIG. 4, connected blocks through which trains can travel are defined.

A block connected to the up side of the block [B1001] is not illustrated and is represented by three dots, and no point machine is connected with the bock [B1001]. Thus, regarding the block [B1001], no data is present for the block connected to the up side and the point machine condition, and [B1002] is indicated for the block connected to the down side.

The block [B1002] is connected with the block [B1001] on the up side, with the blocks [B1003] and [B1005] on the down side, and with a point machine 10. Note that N representing "Normal" is written in the database when the direction of the point machine 10 is a normal direction, and R representing "Reverse" is written in the database when the direction of the point machine 10 is a reverse direction. Herein, the direction for the block [B1005] is the normal direction and the direction for the block [B1003] is the reverse direction in FIG. 4. Thus, regarding the block [B1002], [B1001] is indicated as the block connected to the up side, [B1003] and [B1005] are indicated as blocks connected to the down side, "10:R" is indicated as the point machine condition for [B1003] of the blocks connected to the down side, and "10:N" is indicated as the point machine condition for [B1005] of the blocks connected to the down side.

The block [B1003] is connected with the block [B1002] on the up side, with the block [B1004] on the down side, and with the point machine 10 in the reverse direction. Thus, regarding the block [B1003], [B1002] is indicated as the block connected to the up side, [B1004] is indicated as the block connected to the down side, and "10:R" is indicated as the point machine condition for [B1004] that is the block connected to the down side.

A block connected to the down side of the block [B1004] is not illustrated and is represented by three dots, and no point machine is connected with the block [B1004]. Thus, regarding the block [B1004], no data is present for the block connected to the down side and the point machine condition, and [B1003] is indicated as the block connected to the up side.

The block [B1005] is connected with the block [B1002] on the up side, a block connected to the down side of the block [B1005] is not illustrated and is represented by three dots, and the block [B1005] is connected with the point machine 10 in the normal direction. Thus, regarding the block [B1005], no data is present for the block connected to the down side, [B1002] is indicated as the block connected to the up side, and "10:N" is indicated as the point machine condition for [B1002] that is the block connected to the up side.

Figure 5:
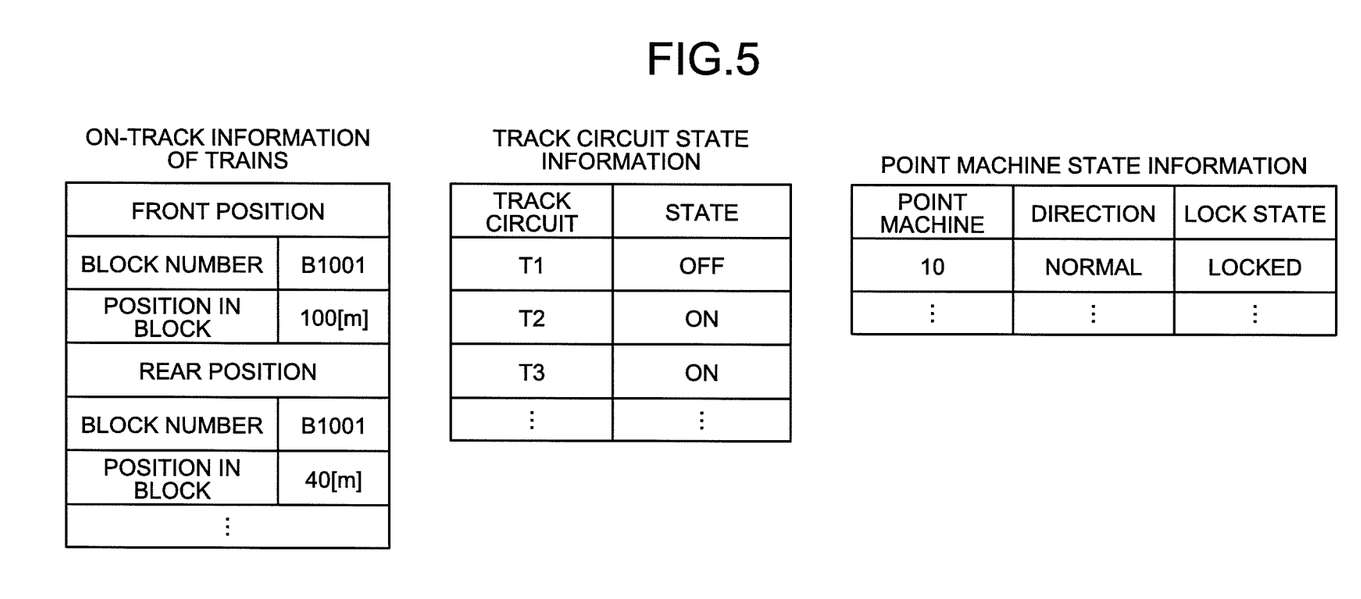
FIG. 5 is a diagram illustrating an example of on-track information of trains, track circuit state information, and point machine state information.

FIG. 5 is a diagram illustrating an example of on-track information of trains, track circuit state information, and point machine state information. The on-track information of trains illustrated in FIG. 5 indicates a front position and a rear position of a train. Herein, the front position of the train is indicated as being at a position of 100 meters from the beginning of the block [B1001] and the rear position of the train is indicated as being at a position of 40 meters from the beginning of the block [B1001].

The track circuit state information of trains illustrated in FIG. 5 indicates whether the states of the track circuits T1, T2, and T3 are ON or OFF. Herein, the state of the track circuit T1 is OFF, and the states of the track circuits T2 and T3 are ON.

The point machine state information illustrated in FIG. 5 indicates the direction and the lock state of each point machine. Herein the direction of the point machine 10 is indicated as being normal, and the lock state of the point machine 10 is indicated as being locked.

Figure 6:
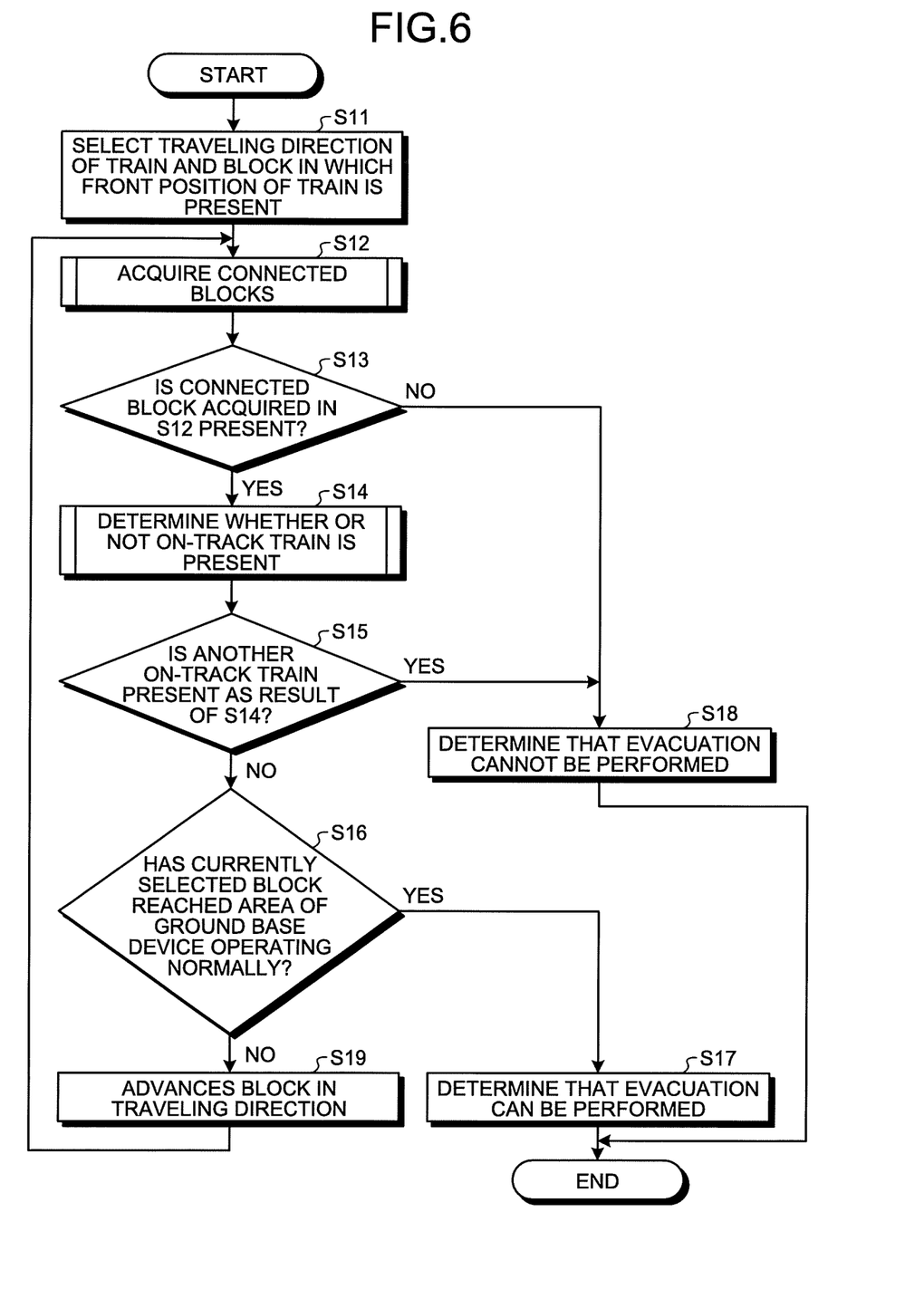
FIG. 6 is a flowchart illustrating an example operation of an on-track vehicle control device when a ground base device is out of order.

FIG. 6 is a flowchart illustrating an example operation of the on-track vehicle control device 1 when the ground base device 3A is out of order. First of all, the on-track vehicle control device 1 starts processing by selecting a train 6A, selects the traveling direction of the train 6A and an on-track block in which the front position of the train 6A is present from the track database stored in the track database storage unit 2 (S11), and performs a subroutine process for acquiring block or blocks connected to the block that is currently selected (S12). Herein, the block that is currently selected is an on-track block in which the front position of the train 6A is present. The subroutine for acquiring the connected blocks will be described later with reference to FIG. 7. The on-track vehicle control device 1 determines whether or not an acquired connected block is present as a result of the subroutine of S12 (S13).

If no connected block acquired in S12 is present (S13: No), the on-track vehicle control device 1 determines that evacuation cannot be performed (S18), and ends the processing. If a connected block acquired in S12 is present (S13: Yes), the on-track vehicle control device 1 performs a subroutine process for determining whether or not an on-track train is present (S14). The on-track vehicle control device 1 then determines whether or not another on-track train is present from the result of S14 (S15). Note that the subroutine of S14 for determining whether or not an on-track train is present will be described later with reference to FIG. 8.

If another on-track train is present as a result of S14 (S15: Yes), the on-track vehicle control device 1 determines that evacuation cannot be performed (S18), and ends the processing. If no other on-track train is present as a result of S14 (S15: No), the on-track vehicle control device 1 determines whether or not the currently selected block has reached an area where a ground base device is currently operating in a normal way (S16).

If the selected block has reached an area where a ground base device is currently operating in a normal way (S16: Yes), the on-track vehicle control device 1 determines that evacuation can be performed (S17), and ends the processing. If the selected block has not reached an area where a ground base device is currently operating in a normal way (S16: No), the on-track vehicle control device 1 advances the selected block in the traveling direction (S19), and returns to S12. Note that, if it is determined that evacuation can be performed, the train 6A is operated to be evacuated to the area where the ground base device is currently operating in a normal way. Such an evacuation operation may be performed automatically, or by the train driver with the determination result being displayed on a driver's console.

Figure 7:
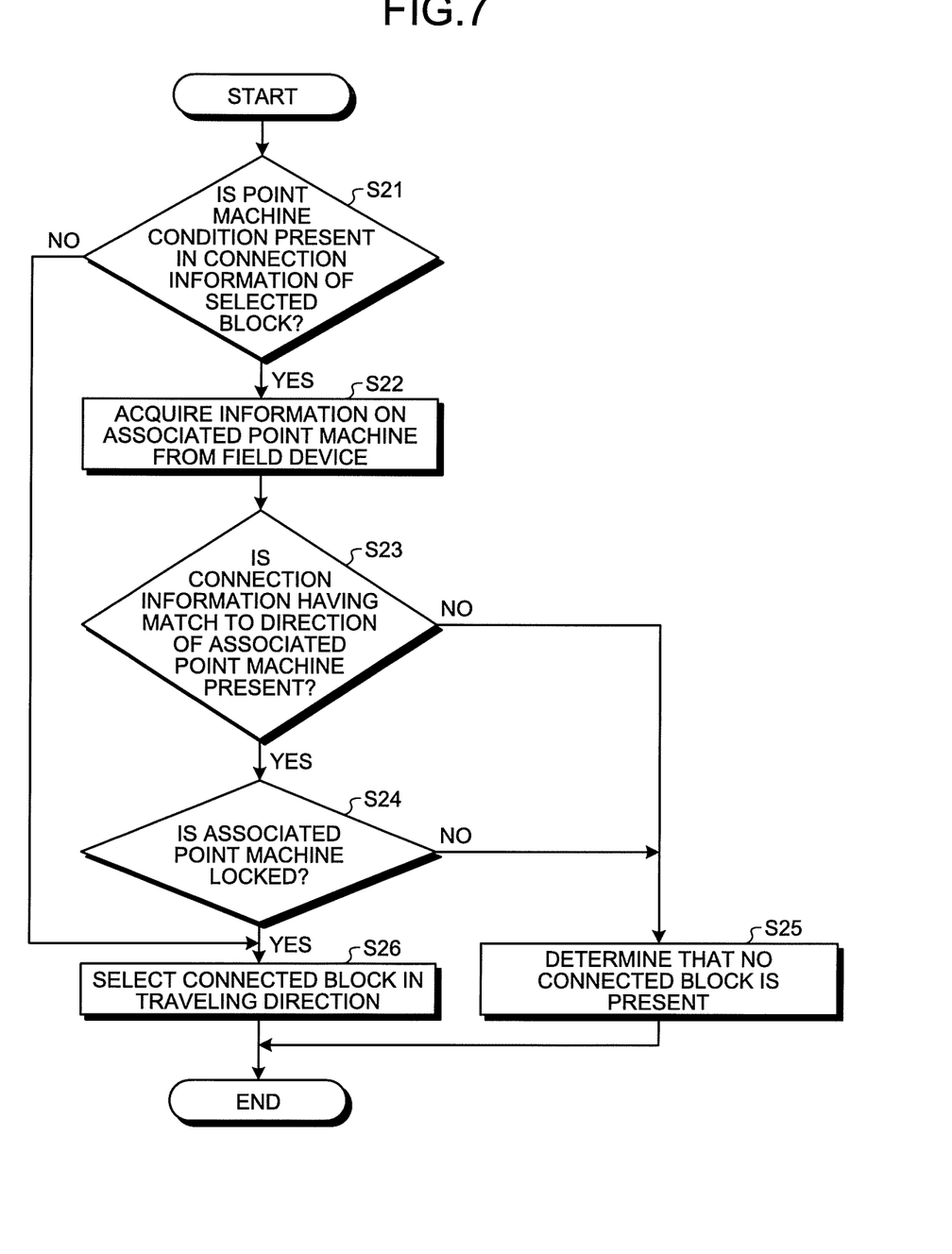
FIG. 7 is a flowchart illustrating details of a subroutine process of S12.

FIG. 7 is a flowchart illustrating details of the subroutine process of S12. First of all, when the process of S12 is started, the on-track vehicle control device 1 determines whether or not a point machine condition is present in connection information of the selected block (S21). If no point machine condition is present in the connection information of the selected block (S21: No), the number of blocks that can be selected is one, and so the on-track vehicle control device 1 selects a connected block in the traveling direction (S26), and ends the subroutine process. If a point machine condition is present in the connection information of the selected block (S21: Yes), the on-track vehicle control device 1 acquires information on the point machine in question (S22), and determines whether or not connection information that has a match to the direction of the point machine is present (S23). Note that the information on the point machine includes the direction and the lock state of the point machine, which are acquired from a field device. If no connection information that has a match to the direction of the point machine is present (S23: No), the direction of the point machine is assumed to be unknown, and the on-track vehicle control device 1 determines that no connected block is present (S25), and ends the subroutine process. If connection information that has a match to the direction of the point machine is present (S23: Yes), the on-track vehicle control device 1 determines whether or not the point machine has been locked (S24). If the point machine has not been locked (S24: No), the on-track vehicle control device 1 determines that no connected block is present (S25), and ends the subroutine process. If the point machine has been locked (S24: Yes), the on-track vehicle control device 1 selects a connected block in the traveling direction (S26), and ends the subroutine process.

Figure 8:
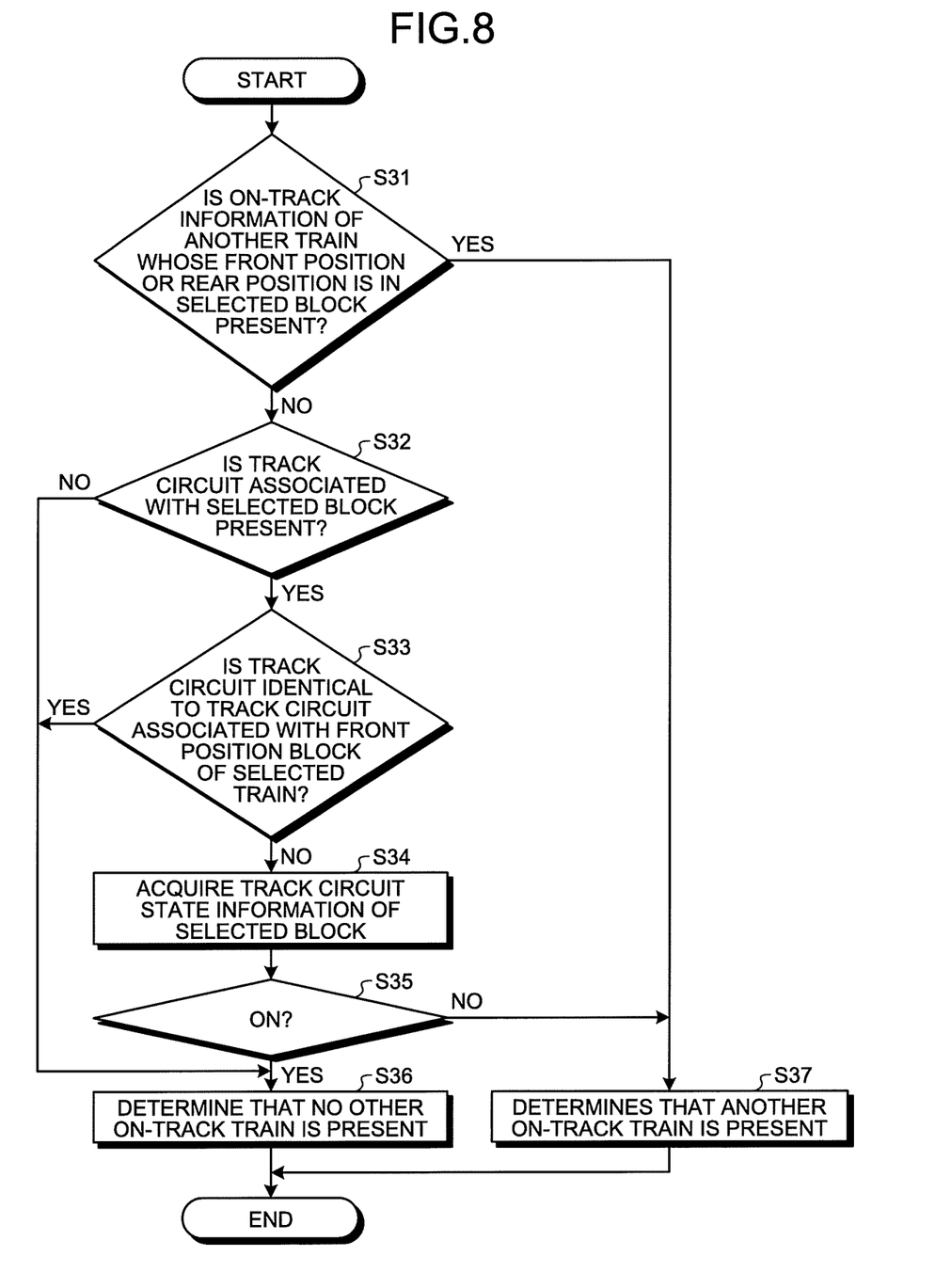
FIG. 8 is a flowchart illustrating details of a subroutine process of S14.

FIG. 8 is a flowchart illustrating details of the subroutine process of S14. First of all, when the process of S14 is started, the on-track vehicle control device 1 determines whether or not on-track information of another train whose front position or rear position is in the selected block is present (S31). If on-track information of another train whose front position or rear position is in the selected block is present (S31: Yes), the on-track vehicle control device 1 determines that another on-track train is present (S37), and ends the subroutine process. If no on-track information of another train whose front position or rear position is in the selected block is present (S31: No), the on-track vehicle control device 1 determines whether or not a track circuit associated with the selected block is present (S32). If no track circuit associated with the selected block is present (S32: No), the on-track vehicle control device 1 determines that no other on-track train is present (S36), and ends the subroutine process. If a track circuit associated with the selected block is present (S32: Yes), the on-track vehicle control device 1 determines whether or not the track circuit is identical to the track circuit associated with a block where the front position of the selected train is present (S33). If the track circuit is identical to the track circuit associated with the front position block of the selected train (S33: Yes), the on-track vehicle control device 1 determines that no other on-track train is present (S36), and ends the processing. If the track circuit is not identical to the track circuit associated with the front position block of the selected train (S33: No), the on-track vehicle control device 1 acquires track circuit state information of the selected block (S34), and determines whether or not the track circuit is ON (S35). If the track circuit is not ON (S35: No), the on-track vehicle control device 1 determines that another on-track train is present (S37), and ends the subroutine process. If the track circuit is ON (S35: Yes), the on-track vehicle control device 1 determines that no other on-track train is present (S36), and ends the subroutine process.

Figure 9:
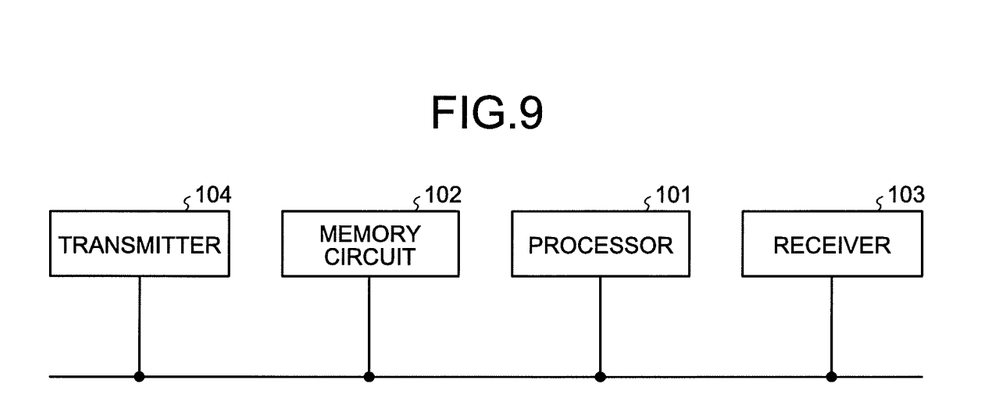
FIG. 9 is a diagram illustrating a typical example configuration of hardware by which the on-track vehicle control device is implemented in the first embodiment.

Note that, in the first embodiment described above, the on-track vehicle control device 1 includes a processor, a memory circuit, a receiver, and a transmitter, and their respective operations can be implemented by software. FIG. 9 is a diagram illustrating a typical example configuration of hardware implementing the on-track vehicle control device 1 in the first embodiment. The device illustrated in FIG. 9 includes a processor 101, a memory circuit 102, a receiver 103, and a transmitter 104, in which the processor 101 performs computation and control by software using received data, and the memory 102 stores received data or data and software necessary for the processor 101 to perform computation and control. The receiver 103 is an interface that receives information from outside. The transmitter 104 is an interface that transmits information to outside. Note that it is possible to adopt a configuration having a plurality of processors each corresponding to the processor 101, a plurality of memory circuits each corresponding to the memory circuit 102, a plurality of receivers each corresponding to the receiver 103, and a plurality of transmitters each corresponding to the transmitter 104.

According to the first embodiment, no device for train detection connected with the on-track vehicle control device is needed, and a radio train control system capable of suppressing the increase in facility cost and reliably performing on-track control of trains even when a ground base device is out of order is achieved.

In addition, according to the first embodiment, on-track vehicle control can be performed in dependence upon the states of track circuits when a control device mounted on a train is out of order.

Furthermore, according to the first embodiment, evacuation operation of a train from an area where a ground base device has been out of order can be performed even in the state in which the ground base device is out of order. Thus, the radio train control system can be resumed at an early point without waiting for recovery of the ground base device by making a train shuttle back and forth in areas adjacent to the area where the ground base device has been out of order.

Second Embodiment

In the first embodiment described above, there may be a case where the direction of a point machine cannot be changed and it is difficult to perform efficient evacuation operation of a train on a track depending on the direction of a point machine when a ground base device is out of order. In the circumstances, description is given in the second embodiment for a radio train control system capable of controlling the direction of a point machine even when a failure occurs.

Figure 10:
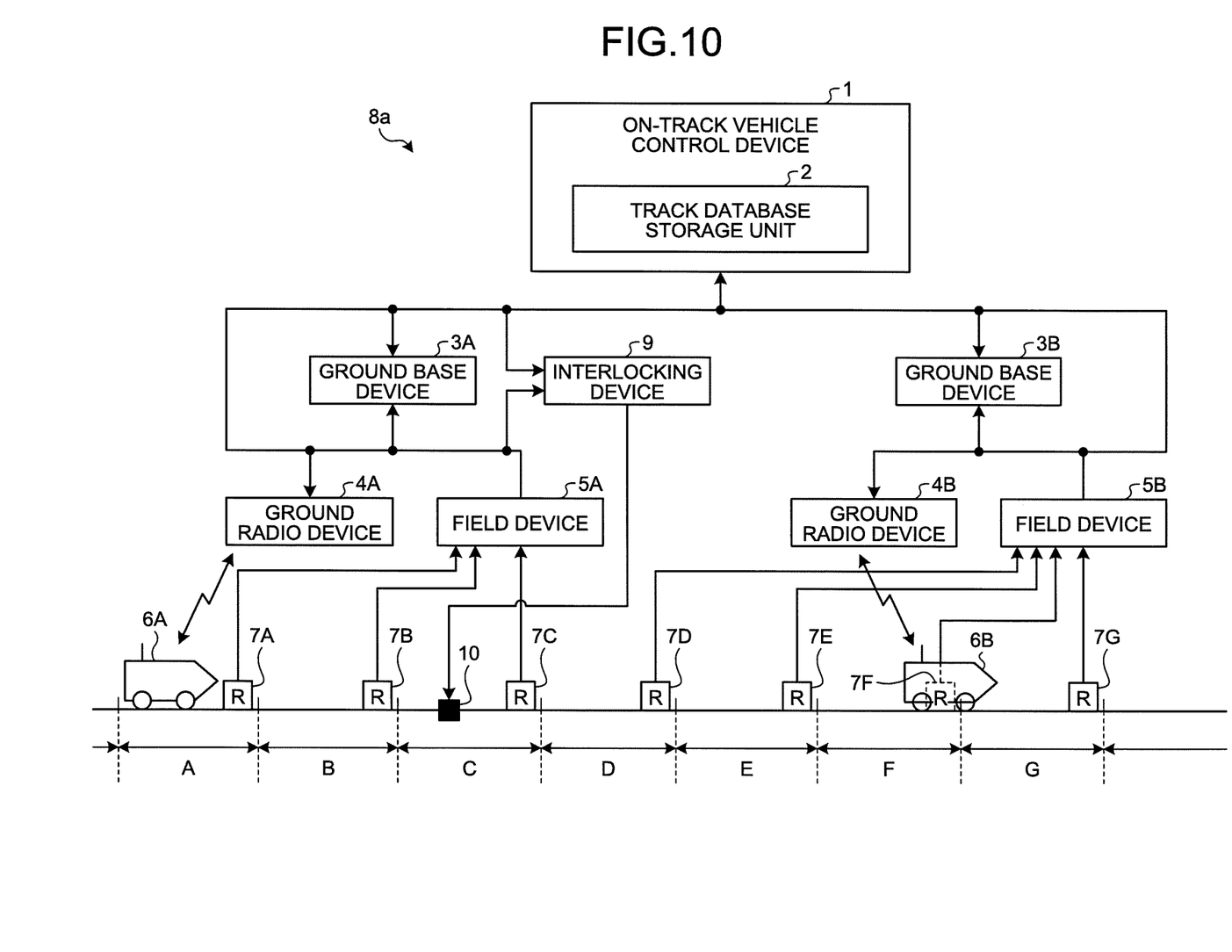
FIG. 10 is a diagram illustrating an example configuration of a radio train control system according to a second embodiment.

FIG. 10 is a diagram illustrating an example configuration of a radio train control system 8a according to the second embodiment of the present invention. The radio train control system 8a illustrated in FIG. 10 has the same configuration as the radio train control system 8 illustrated in FIG. 1 except that an interlocking device 9 and a point machine 10 are added to the system 8.

The point machine 10 is provided in a track circuit represented by C. The interlocking device 9 is a device that is provided between the on-track vehicle control device 1 and the ground radio devices 4A and 4B, and is capable of controlling the direction of the point machine 10 on the track. In a case where the direction of the point machine 10 is unknown, the interlocking device 9 can control the direction of the point machine 10 according to an instruction from the on-track vehicle control device 1 so that a train on the track can perform evacuation operation. Alternatively, in a case where a train that cannot be evacuated because of the direction of the point machine 10 is present, the interlocking device 9 can control the direction of the point machine 10 according to an instruction from the on-track vehicle control device 1 so that the evacuation operation can be performed.

According to the second embodiment, evacuation operation of a train on the track is enabled regardless of the direction of a point machine when a ground base device is out of order.

The configurations presented in the embodiments above are examples of the present invention, and can be combined with other publicly known techniques and partly omitted and/or modified without departing from the scope of the present invention.

REFERENCE SIGNS LIST 1 on-track vehicle control device; 2 track database storage unit; 3A, 3B ground base device; 4A, 4B ground radio device; 5A, 5B field device; 6A, 6B train; 7A, 7B, 7C, 7D, 7E, 7F, 7G relay; 8, 8a radio train control system; 9 interlocking device; 10 point machine; 101 processor; 102 memory circuit; 103 receiver; 104 transmitter.

The invention claimed is:

1. A radio train control system that controls a train on a track on which a track circuit is built, the radio train control system comprising:
a ground radio device to perform radio communication with the train and acquire position information of the train;
a field device to acquire track circuit state information indicating whether the track circuit is ON or OFF;
a ground base device to receive the position information and the track circuit state information and transmit control information to the train; and
an on-track vehicle control device to manage on-track information including either of the position information or the track circuit state information,
wherein the ground radio device and the field device have a transmission path connected with the on-track vehicle control device without using the ground base device, and the on-track vehicle control device is capable of transmitting the control information to the train through the transmission path when the ground base device is out of order.

2. The radio train control system according to claim 1, further wherein the on-track vehicle control device receives the track circuit state information through the transmission path when the ground radio device is out of order.

3. The radio train control system according to claim 1, further wherein when the ground base device is out of order, the on-track vehicle control device refers to the on-track information and evacuates the train to a control area of another ground base device that is operating normally.

4. The radio train control system according to claim 1, further comprising an interlocking device that is provided between the on-track vehicle control device and the ground radio device, and is capable of controlling a point machine on the track.

5. A radio train control method for an on-track vehicle control device to perform evacuation operation of evacuating a train from a control area controlled by a ground base device when the ground base device is out of order, the radio train control method comprising:
selecting, by the on-track vehicle control device, an on-track block in which a front position of the train is present;
acquiring, by the on-track vehicle control device, a connected block connected with the on-track block, the connected block being present in a traveling direction of the train;
determining, by the on-track vehicle control device, that evacuation operation of the train cannot be performed when no connected block connected with the on-track block is present and no connected block is acquired;
determining, by the on-track vehicle control device, whether or not another train is present in the control area of the ground base device;
determining, by the on-track vehicle control device, that evacuation operation of the train cannot be performed when another train is present in the control area;
determining, by the on-track vehicle control device, that evacuation can be performed when the train is present in a control area of a ground base device that is operating normally; and
advancing selection, by the on-track vehicle control device, of an on-track block by one block in the traveling direction of the train when the train is not present in a control area of a ground base device that is operating normally.

* * * * *